US009763312B2

(12) United States Patent
Peng (10) Patent No.: US 9,763,312 B2
(45) Date of Patent: Sep. 12, 2017

(54) DIMMING LAMPHOLDER (71) Applicant: Rich Brand Industries Limited, Dongguan, Guangdong Province (CN)

(72) Inventor: Te-Shui Peng, Taoyuan (TW)

(73) Assignee: Rich Brand Industries Limited, Dongguan (CN)

( * ) Notice: Subject to any disclaimer, the term of this patent is extended or adjusted under 35 U.S.C. 154(b) by 51 days.

(21) Appl. No.: 14/862,411

(22) Filed: Sep. 23, 2015

(65) Prior Publication Data

US 2017/0082274 A1    Mar. 23, 2017

(51) Int. Cl.
H05B 33/08    (2006.01)
H05B 41/40    (2006.01)

(52) U.S. Cl.
CPC ......... *H05B 41/40* (2013.01); *H05B 33/0845* (2013.01)

(58) Field of Classification Search
CPC .... F21V 23/006; H05B 33/0845; H05B 33/08
See application file for complete search history.

(56) References Cited

U.S. PATENT DOCUMENTS

| 3,836,814 | A | * | 9/1974 | Rodriquez | ......... | H01R 33/9453 |
| | | | | | | 315/194 |
| 6,227,912 | B1 | * | 5/2001 | Hung | ................. | H01R 33/9555 |
| | | | | | | 200/51.17 |
| 2008/0253128 | A1 | * | 10/2008 | Huang | ............... | H01R 33/9555 |
| | | | | | | 362/295 |
| 2009/0296390 | A1 | * | 12/2009 | Dubord | .................... | B60Q 1/24 |
| | | | | | | 362/240 |
| 2011/0203909 | A1 | * | 8/2011 | Yang | ........................ | H01H 3/42 |
| | | | | | | 200/51.17 |
| 2016/0319996 | A1 | * | 11/2016 | Moon | ....................... | F21S 8/02 |

* cited by examiner

*Primary Examiner* — Chanh Nguyen
*Assistant Examiner* — Jonathan G Cooper
(74) *Attorney, Agent, or Firm* — Alan D. Kamrath; Kamrath IP Lawfirm, P.A.

(57) ABSTRACT

A dimming lampholder includes a printed circuit board installed in the dimming lampholder, a switch and a dimming circuit installed in dimming lampholder and operated together with a dimmable energy-saving fluorescent bulb and a dimmable LED bulb. The dimmable energy-saving fluorescent bulb and the dimmable LED bulb may be installed and used directly to achieve the effect of adjusting the brightness of the emitting light.

5 Claims, 7 Drawing Sheets

DIMMING LAMPHOLDER

BACKGROUND OF THE INVENTION

Field of the Invention

The present invention relates to a dimming lampholder and, more particularly, to the dimming lampholder having a switch and a dimming circuit installed on a printed circuit board and operated with a dimmable energy-saving fluorescent bulb and a dimmable LED bulb, so that the dimmable energy-saving fluorescent bulb and the dimmable LED bulb may be installed and used directly.

Description of the Related Art

Lampholder is a device for installing and supporting a light emitting element (such as an incandescent bulb). At early stages, most lampholders just have the effects of turning ON and OFF a current but cannot adjust the brightness of the light emitting element. With rising awareness of energy saving and carbon reduction, more and more users have different requirements on the power saving feature of the lampholders. To cope with market requirements, dimmable lampholders are introduced to the market. Most conventional dimming lampholders adopt the measure of changing voltage or resistance to adjust the brightness of the light emitting element. However, such dimming method is just applicable for incandescent bulbs of higher power consumption, and cannot be used in fluorescent bulbs or LED bulbs of a better power saving effect.

As science and technology advance, the light emitting element changes rapidly. A dimmable energy-saving fluorescent bulb and a dimmable LED bulb have been developed, and the power-saving fluorescent bulb and LED bulb are equipped with a dimming mechanism. However, the aforementioned conventional dimming lampholder cannot be used with the newly developed dimmable energy-saving fluorescent bulb and dimmable LED bulb, so that it is necessary to design and develop a dimming holder for the dimmable energy-saving fluorescent bulb and the dimmable LED bulb to extend the scope of applicability and meet user requirements.

SUMMARY OF THE INVENTION

Therefore, it is a primary objective of the present invention to provide a dimming lampholder that can be connected directly to a dimmable energy-saving fluorescent bulb and a dimmable LED bulb to achieve the dimming effect.

To achieve the aforementioned and other objectives, the present invention provides a dimming lampholder comprising a seat, a cover body, a cap, a screwing ring, a printed circuit board, a knob and a plurality of electrical connecting plates. A circular stepped surface is formed at the external periphery of the top surface of the seat, and a positioning slot, a plurality of first engaging holes and a plurality of second engaging holes are formed on a surface enclosed by the circular stepped surface. The seat is extended downwardly to form a cylindrical shape and has an opening formed at the bottom of the seat and penetrating into the seat, and a plurality of clamping slots is formed on the seat.

The cover body includes a plurality of engaging hole pillars protruded from the top of the cover body, and a plurality of arc chutes disposed around the periphery of the cover body and symmetrical with one another, with an insert hole with an expanded internal diameter being connected to an end of each chute.

The cap is a circular arc cap shaped object and includes an outwardly protruding ring disposed near the bottom of the cap and having an outer thread formed at the bottom of the outwardly protruding ring and provided for connection. A penetrating hole is formed at the center of the top of the outwardly protruding ring, with the bottom of the cap being an inwardly penetrating opening. A penetrating slot is formed on a circular wall.

The screwing ring has a hollow penetrating the bottom of the screwing ring, and a circular stepped surface formed inwardly at the bottom of the screwing ring. An inner thread is formed on an inner side of the screwing ring.

The printed circuit board has a switch, a dimming circuit installed on a side of the printed circuit board, a knob coupled to the switch and the dimming circuit, and a plurality of electrical connecting screws installed at the top of the printed circuit board. The electrical connecting screws are electrically connectable to the switch and the dimming circuit, and the bottom of the printed circuit board has a plurality of conductive plates formed into a bent shape. The horizontal section faces outward, and its distal end has an engaging hole. The plurality of conductive plates is electrically coupled with the switch and the dimming circuit.

The electrical connecting plates are formed into a bent shape, and each has an engaging hole formed at the top of the electrical connecting plate and an abutting portion formed at the bottom of the electrical connecting plate.

The printed circuit board is vertically erected from a bottom end from the positioning slot formed at the top side of the seat, so that the engaging holes of the conductive plate coupled to the bottom of the printed circuit board are one-to-one corresponsive to the first engaging holes of the seat.

The electrical connecting plates are installed into an opening of the bottom of the seat in an upward direction of the engaging hole of the electrical connecting plates. A middle section of the electrical connecting plates is inserted into a corresponsive clamping slot, and the engaging holes of the electrical connecting plates are one-to-one corresponsive to the first engaging holes of the seat. The engaging hole of the conductive plate coupled to the bottom of the printed circuit board, the first engaging hole of the seat, and the engaging hole of the electrical connecting plate are connected by a plurality of engaging members respectively.

The cover body is accommodated into the seat in an upward direction of the engaging hole pillar. The engaging hole pillars of the cover body in the seat are one-to-one corresponsive to the second engaging holes, and the abutting portions of the electrical connecting plates are one-to-one correspondingly remained at the chutes and on a side of the insert hole. The second engaging holes and the engaging hole pillars are coupled by inserting a plurality of engaging members respectively.

The aforementioned assembly is installed into an opening at the bottom of the cap in an upward direction of the printed circuit board. The knob coupled to the switch and the dimming circuit of the printed circuit board are entered along a penetrating slot of the knob until the circular stepped surface at the external periphery of the top of the seat abuts the bottom edge of the cap.

The screwing ring is sheathed on the external periphery of the seat by a hollow of the screwing ring. An inner thread of the screwing ring is gradually engaged with the outer thread of the bottom of the cap bottom until the circular stepped surface of the screwing ring abuts the outwardly protruding ring of the cap.

In the aforementioned dimming lampholder, the seat has a plurality of positioning ribs disposed within the range of the circular stepped surface. The cap has a plurality of positioning recesses formed at the internal periphery of the bottom of the cap. When the inner thread of the screwing ring is gradually engaged with the outer thread of the bottom of the cap, the positioning ribs formed on the circular stepped surface is one-to-one correspondingly abutted into the positioning recesses formed at the internal periphery of the bottom of the cap.

In the aforementioned dimming lampholder, the top of the printed circuit board is connected to a conductive plate. Then, the electrical connecting screw is secured onto the conductive plate.

The present invention further provides a dimming lampholder comprising a seat, an open cylinder, a cap, a base, a printed circuit board and a knob bracket. The seat is formed into a circular disc shape and has a plurality of through installing holes formed on both sides of the seat and a through hole formed at the middle of the seat.

The open cylinder has a vertical through slot formed at the center of the top of the open cylinder, a through installing hole formed on both sides of the open cylinder separately and configured to be corresponsive to the through installing hole of the seat, and a wall extended downwardly from the open cylinder is a threaded groove wall.

The cap is a circular arc cap shaped object, and has an outwardly protruding ring near the bottom of the cap, an outer thread formed at the bottom of the cap and provided for connection, a penetrating hole formed at the center of the top of the cap, an opening penetrated inwardly from the bottom of the cap, and a penetrating slot formed on a circular wall of the cap.

The base is a longitudinally penetrating ring-shaped object with the bottom as a casing, and the top is formed into a screwing ring with an expanded external diameter. A circular stepped surface is formed at the connecting position of the casing and the screwing ring, and an inner thread is formed on an inner side of the screwing ring and provided for connection.

The printed circuit board has a switch, a dimming circuit installed on a side of the printed circuit board, and a knob is coupled to a side of the switch and the dimming circuit. The top of the printed circuit board has a plurality of electrical connecting screws, and the electrical connecting screws are provided for electrically connecting the switch and the dimming circuit. The bottom of the printed circuit board has a first conductive plate and a second conductive plate, and the first conductive plate is formed into a bent shape. The horizontal section faces outward, and an engaging hole is formed at the distal end of the first conductive plate. The second conductive plate is bent with an angle greater than 90 degrees, and the bent oblique section is downwardly oblique. A conductive bump is formed at the center of the bottom near the oblique section. The first conductive plate, the second conductive plat, the switch and the dimming circuit are electrically coupled to one another.

The printed circuit board is vertically installed onto the seat, so that an engaging hole formed on a horizontal section of the first conductive plate is configured to be corresponsive to one of the through installing holes of the seat. The oblique section of the second conductive plate is passed and installed into the through hole formed at the center of the seat, while the open cylinder is installed to the bottom of the seat. The oblique section of the second conductive plate is extended downwardly and obliquely from the vertical through slot, and the through installing hole of the open cylinder is attached to the through installing hole of the seat. After one of a plurality of engaging members is passed through the engaging hole of the first conductive plate, a through installing hole of the seat, and a through installing hole of the open cylinder, the other engaging member is passed through the other through installing hole of the seat and the other through installing hole of the open cylinder. The aforementioned assembly is accommodated into an opening formed at the bottom of the cap in an upward direction of the printed circuit board. The knob disposed on the printed circuit board and coupled to the switch and the dimming circuit is entered along the penetrating slot of the cap, and a hollow of the base is sheathed from bottom to top on the open cylinder and the exterior of the seat. The inner thread of the screwing ring and the outer thread of the cap bottom are engaged gradually until the outwardly protruding ring of the cap and the circular stepped surface of the base clamp the seat.

In the aforementioned dimming lampholder, the top of the printed circuit board is connected to a conductive plate, and, then, the electrical connecting screw is secured onto the conductive plate.

DETAILED DESCRIPTION OF THE PREFERRED EMBODIMENTS

The technical characteristics, contents, advantages and effects of the present invention will be apparent with the detailed description of preferred embodiments accompanied with related drawings as follows.

With reference to FIGS. 1 to 4 for a dimming lampholder 1 in accordance with the first preferred embodiment of the present invention, the dimming lampholder 1 comprises a seat 10, a cover body 11, a cap 12, a screwing ring 13, a printed circuit board 14, a knob 15 and a plurality of electrical connecting plates 16.

Figure 3:
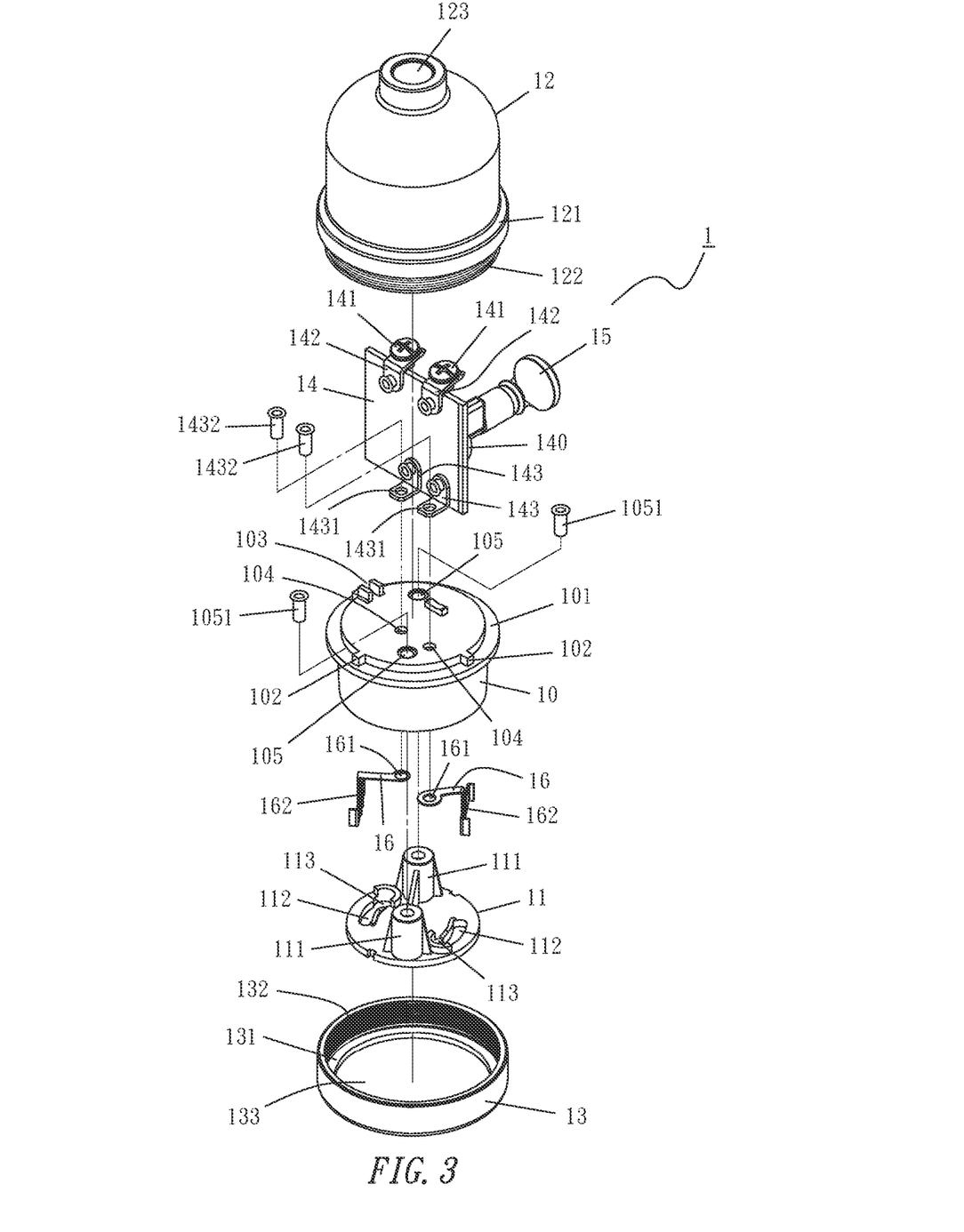
FIG. 3 is an exploded top view of a dimming lampholder in accordance with the first preferred embodiment of the present invention.
Figure 4:
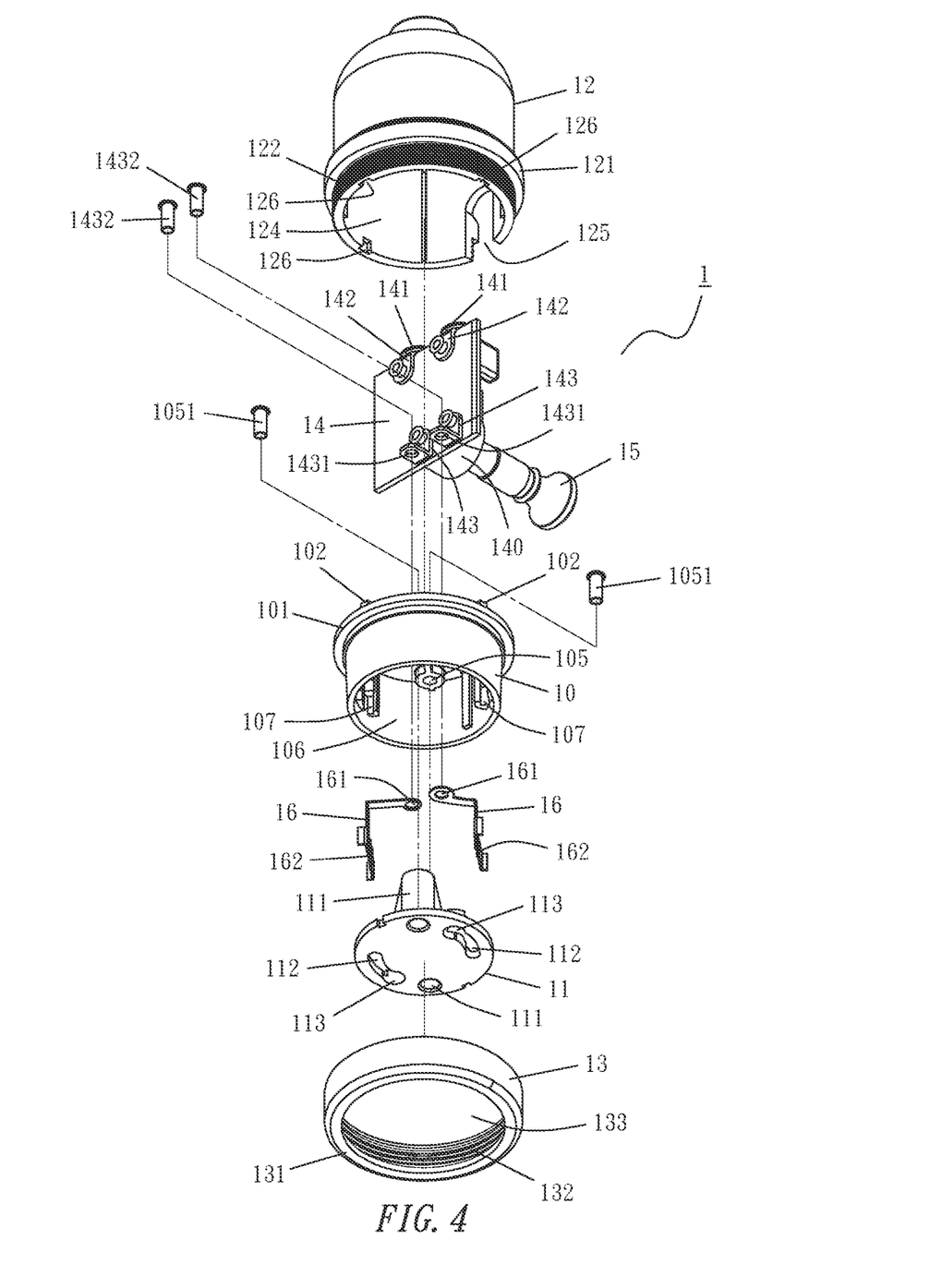
FIG. 4 is an exploded bottom view of a dimming lampholder in accordance with the first preferred embodiment of the present invention.

In FIGS. 3 and 4, a circular stepped surface 101 is formed at the external periphery of the top surface of the seat the seat 10, and a plurality of positioning ribs 102 (such as three positioning ribs 102) is disposed within the range of the circular stepped surface 101. A positioning slot 103, a plurality of first engaging holes 104 and a plurality of second engaging holes 105 are formed on a surface enclosed by the circular stepped surface 101, and the first engaging holes 104 and the second engaging hole 105 are penetrated downwardly to the outside. In FIG. 4, the seat 10 is in a cylindrical shape, and has an opening 106 formed at the bottom and communicated to the inside and a plurality of clamping slots 107 formed therein.

In FIGS. 3 and 4, a plurality of engaging hole pillars 111 is protruded from the top of the cover body 11 and penetrated from top to bottom, and a plurality of arc chutes 112 is formed symmetrically with one another and disposed at the periphery of the cover. An end of each arc chute 112 has an insert hole 113 with an expanded internal diameter.

In FIGS. 3 and 4, the cap 12 is a circular arc cap shaped object and includes an outwardly protruding ring 121 disposed near the bottom of the cap 12, an outer thread 122 formed at the bottom of the outwardly protruding ring 121 and provided for connection, and a penetrating hole 123 formed at the center of the top of the outwardly protruding ring 121. The bottom of the cap 12 is an opening 124 penetrated inwardly to the penetrating hole 123. A penetrating slot 125 is formed on a circular wall, and a plurality of positioning recesses 126 (such as three positioning recesses 126) is formed at the internal periphery of the bottom edge.

In FIGS. 3 and 4, a circular stepped surface 131 is formed inwardly on the bottom of the screwing ring 13. An inner side of the circular stepped surface 131 has an inner thread 132 provided for connection, and the bottom side is a penetrating hollow 133.

Figure 5:
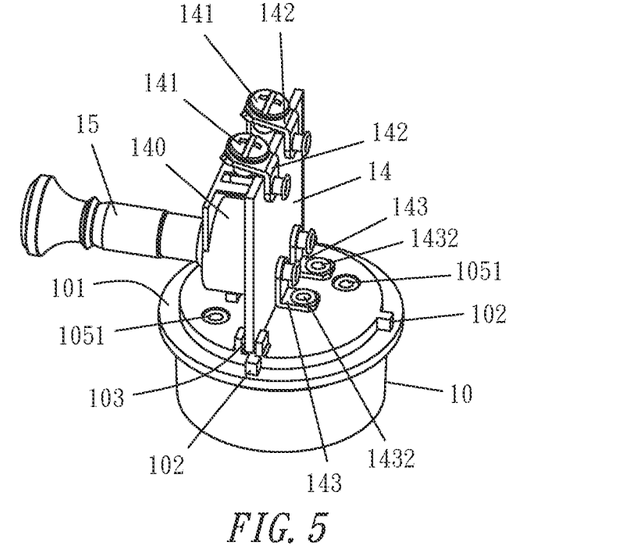
FIG. 5 is a perspective view of assembling a printed circuit board, a knob, a seat and an electrical connecting plate in accordance with the first preferred embodiment of the present invention.

In FIGS. 3, 4 and 5, the printed circuit board 14 is erected vertically. A side of the printed circuit board 14 has a switch and a dimming circuit 140, and a side of the switch and the dimming circuit 140 is coupled to the knob 15. In other words, the switch and the dimming circuit 140 are installed onto the printed circuit board 14 directly, and the knob 15 is connected to an outer side of the printed circuit board 14. The top of the printed circuit board 14 has a plurality of electrical connecting screws 141, and a conductive plate 142 is coupled to the printed circuit board 14 (by riveting, for example). Then, the electrical connecting screws 141 are secured onto the conductive plate 142, so that the electrical connecting screws 141 are electrically coupled to the switch and the dimming circuit 140 on the printed circuit board 14. The bottom of the printed circuit board 14 is coupled to a plurality of conductive plates 143 (by riveting, for example) and formed into a bent shape, so that a horizontal section faces outward, and so that an engaging hole 1431 is formed at a distal end. The plurality of conductive plates 143 is electrically coupled to the switch and the dimming circuit 140 installed on the printed circuit board 14.

Figure 1:
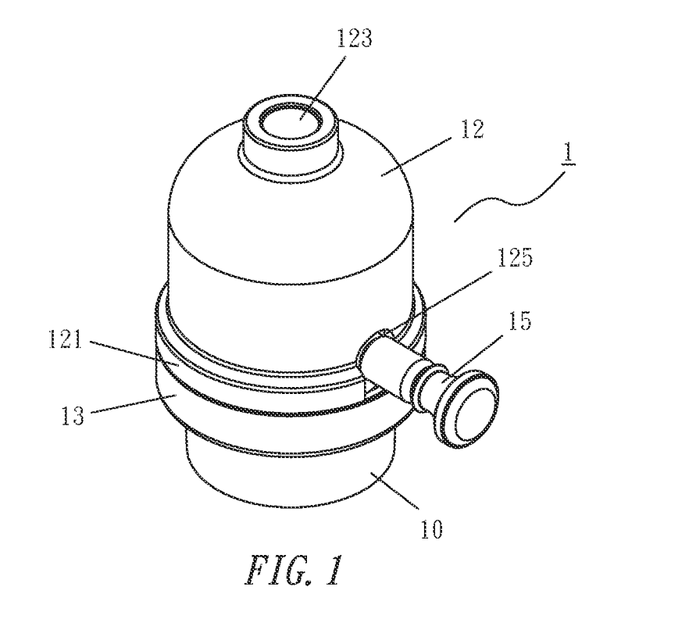
FIG. 1 is a perspective top view of a dimming lampholder in accordance with a first preferred embodiment of the present invention.
Figure 2:
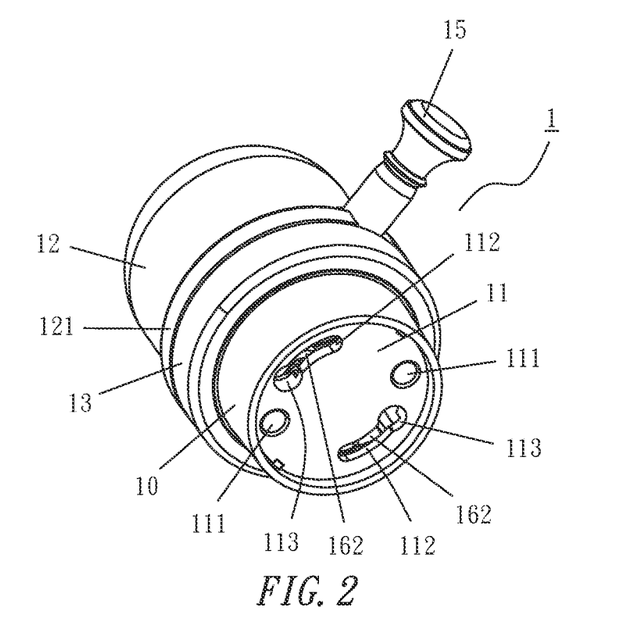
FIG. 2 is a perspective bottom view of a dimming lampholder in accordance with the first preferred embodiment of the present invention.

In FIGS. 1 and 2, the electrical connecting plates 16 must be formed into a bent shape. The top end is an engaging hole 161, and the bottom end is formed into an abutting portion 162.

During an assembling process, the printed circuit board 14 is vertically erected from an end of its bottom and installed into the positioning slot 103 of the top of the seat 10 to achieve the positioning effect, so that a plurality of engaging holes 1431 formed on a horizontal section of the conductive plate 143 coupled to the bottom of the printed circuit board 14 is configured to be one-to-one corresponsive to the first engaging holes 104. In the meantime, the electrical connecting plates 16 are installed into the opening 106 formed at the bottom of the seat 10 from an upward direction of the engaging hole 161, so that a middle section of the electrical connecting plates 16 is inserted into a corresponsive clamping slot 107, and so that the engaging holes 161 of the electrical connecting plates 16 are one-to-one corresponsive to the first engaging holes 104. In other words, the engaging holes 1431, the first engaging holes 104 and the engaging holes 161 are attached with one another respectively, so that a plurality of engaging members 1432 (such as rivets) can be inserted into the engaging holes 1431, the first engaging holes 104 and the engaging holes 161 respectively to achieve the purpose of connection (by riveting, for example). In FIG. 5, the printed circuit board 14, the seat 10 and the electrical connecting plates 16 are assembled and combined.

Figure 6:
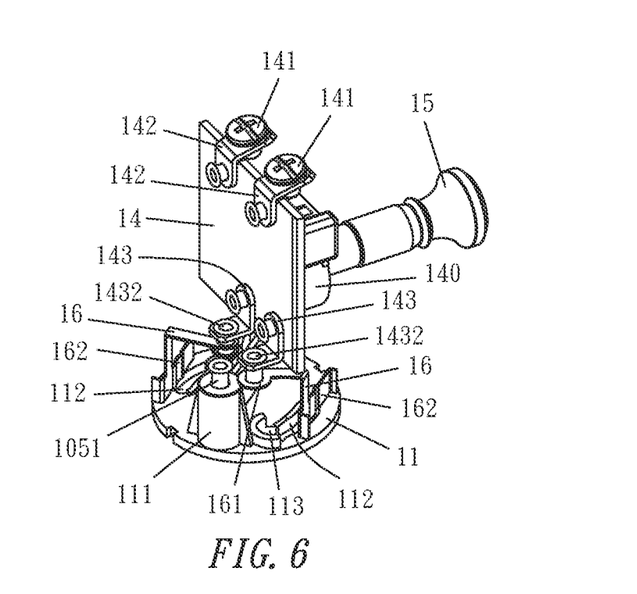
FIG. 6 is a perspective view of assembling a printed circuit board, a knob, an electrical connecting plate and a cover body in accordance with the first preferred embodiment of the present invention.

Then, the cover body 11 is installed into the opening 106 formed at the bottom of the seat 10 by the engaging hole pillar 111 in an upward direction, so that the engaging hole pillars 111 of the cover body 11 in the seat 10 are configured to be precisely one-to-one corresponsive to the second engaging holes 105. The abutting portions 162 of the electrical connecting plates 16 are one-to-one correspondingly remained on a side of the chutes 112 and the insert hole 113, so that a plurality of engaging members 1051 (such as rivets) is inserted into the second engaging holes 105 and the engaging hole pillars 111 for connection (such as by riveting, for example), and so that the seat 10 and the cover body 11 are assembled and combined. To make it easier to understand, the cover body 11 is hidden, so that the structural relation between the conductive plate 143 of the printed circuit board 14, the electrical connecting plates 16, and the cover body 11 is as shown in FIG. 6.

The assembly comprised of the seat 10, the cover body 11, the printed circuit board 14, the knob 15 and the electrical connecting plate 16 is accommodated into the opening 124 formed at the bottom of the cap 12 in an upward direction of the printed circuit board 14. During the assembly process, a knob 15 connected to the switch and the dimming circuit 140 of the printed circuit board 14 is entered along the penetrating slot 125, until the circular stepped surface 101 of the external periphery of the top of the seat 10 abuts the bottom of the cap 12, and the positioning ribs 102 of the circular stepped surface 101 abuts the positioning recesses 126 at the internal periphery of the bottom of the cap 12 respectively.

Finally, the penetrating hollow 133 of the screwing ring 13 is sheathed on the external periphery of the seat 10 and pushed upward, and the inner thread 132 of the screwing ring 13 is gradually engaged with the outer thread 122 at the bottom of the cap 12 until the circular stepped surface 131 of the screwing ring 13 moves upward to abut the outwardly protruding ring 121 of the cap 12, to complete the process of assembling the whole dimming lampholder 1.

Before use, it is necessary to extend a power cable (of a power supply such as the mains power) into the penetrating hole 123 of the cap 12 and process an end of the power cable to form a bare end in order to lock the bare end of the power cable with the electrical connecting screw 141 on the printed circuit board 14 to supply electric power to the switch and the dimming circuit 140 installed on the printed circuit board

14. By operating the switch and the dimming circuit 140, the power is supplied to the electrical connecting plates 16 for future use.

During use, a dimmable energy-saving fluorescent bulb with two electrode rods may be installed. The electrode rods are inserted into the insert holes 113 of the cover body 11 respectively and then slid along the chutes 112, so that the two electrode rods are electrically coupled to the electrical connecting plates 16. The knob 15 may be turned to power on the dimmable energy-saving fluorescent bulb, and the knob 15 may be turned further to make the dimmable energy-saving fluorescent bulb brighter. The main effect resides on that the printed circuit board 14 has a dimmable switch and a dimming circuit 140 installed thereon, so that the knob 15 may be turned to adjust the brightness of the dimmable energy-saving fluorescent bulb directly.

Figure 7:
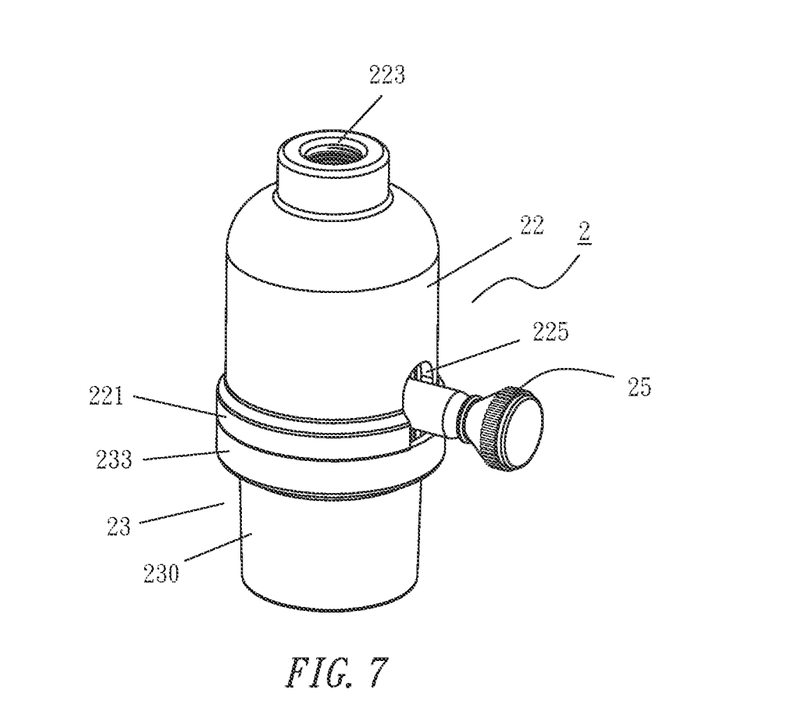
FIG. 7 is a perspective top view of a dimming lampholder in accordance with a second preferred embodiment of the present invention.
Figure 8:
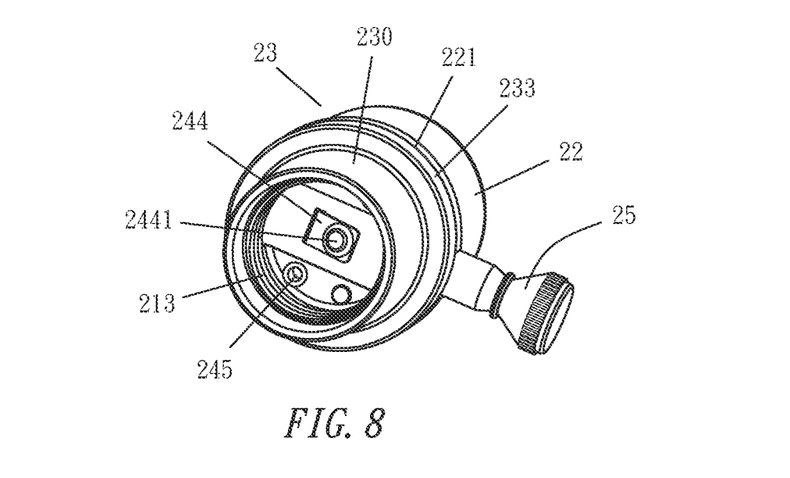
FIG. 8 is a perspective bottom view of a dimming lampholder in accordance with the second preferred embodiment of the present invention.
Figure 9:
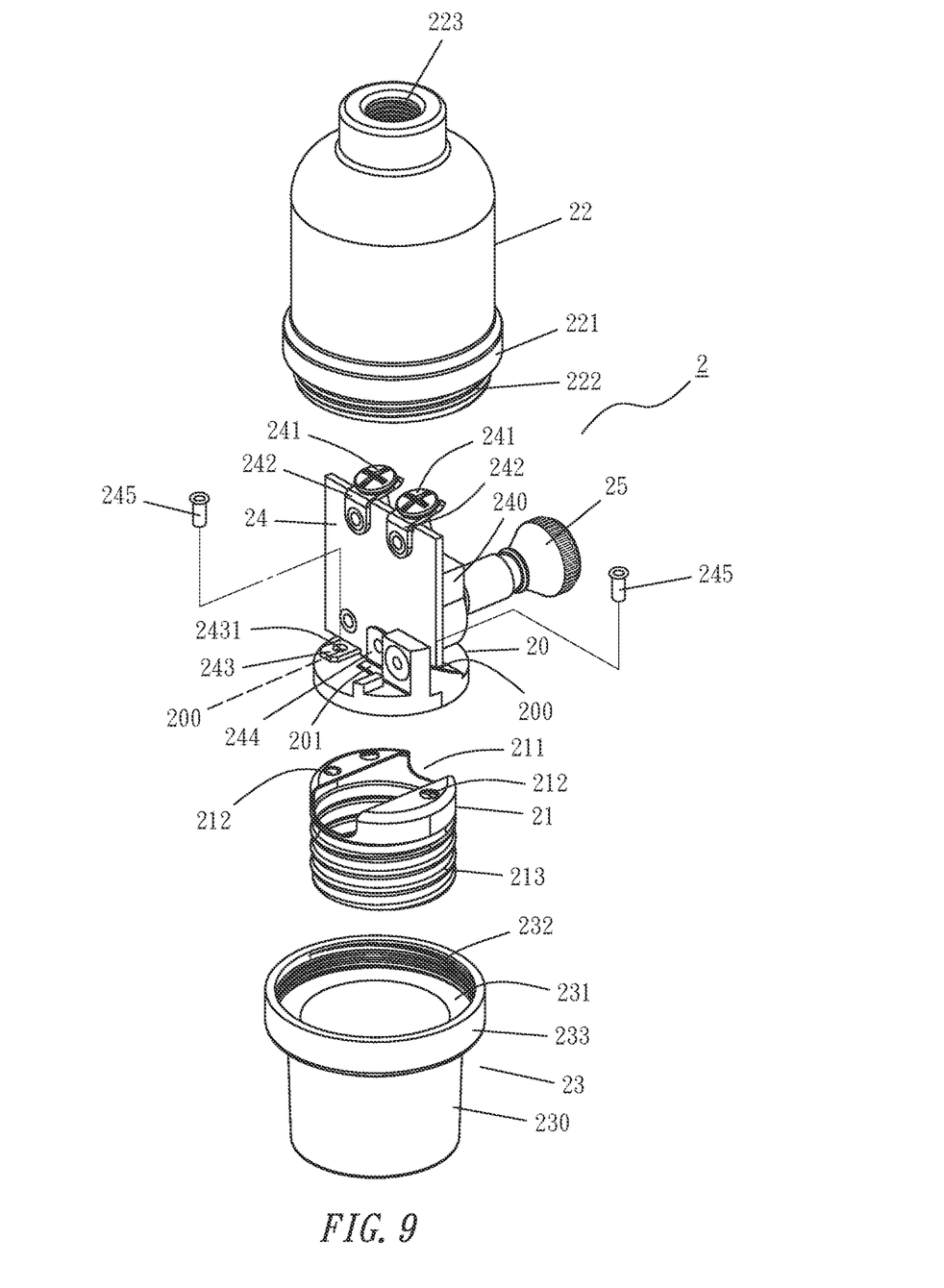
FIG. 9 is an exploded view of a dimming lampholder in accordance with the second preferred embodiment of the present invention.

With respect to FIGS. 7 to 9 for a dimming lampholder 2 in accordance with the second preferred embodiment of the present invention, the dimming lampholder 2 comprises a seat 20, an open cylinder 21, a cap 22, a base 23, a printed circuit board 24 and a knob 25.

Figure 10:
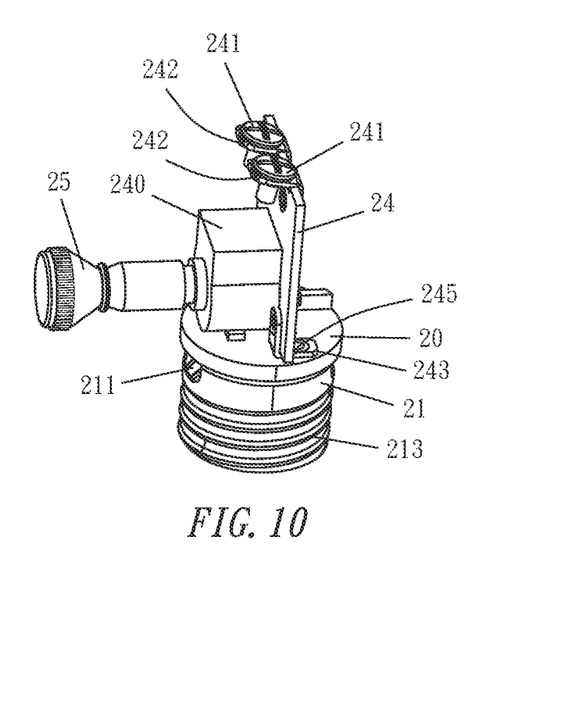
FIG. 10 is a perspective view of assembling a printed circuit board, a knob, a seat and an open cylinder in accordance with the second preferred embodiment of the present invention.
Figure 11:
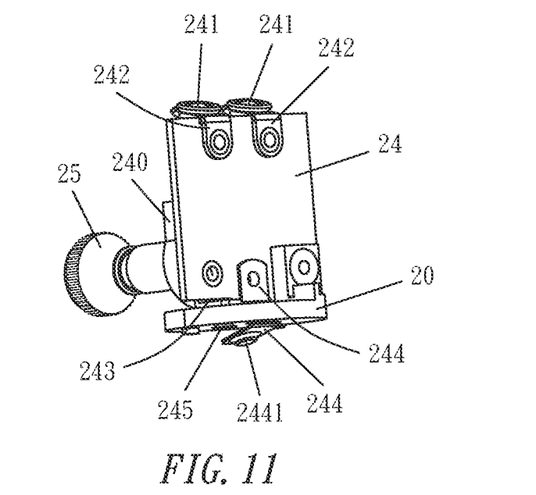
FIG. 11 is a perspective view of assembling a printed circuit board and a knob in accordance with the second preferred embodiment of the present invention.

In FIG. 10, the seat 20 is connected to the printed circuit board 24, and the seat 20 is in a circular disc shape and has a plurality of through installing holes 200 formed on both sides of the seat 20 and a through slot 201 formed at the center of the seat 20. The printed circuit board 24 is vertically erected. A switch and a dimming circuit 240 are installed on a side of the printed circuit board 24, and the knob 25 is installed on a side of the switch and the dimming circuit 240. In other words, the switch and the dimming circuit 240 are installed on the printed circuit board 24 directly, and, then, the outer side of the circuit board is connected to the knob 25. The top of the printed circuit board 24 has a plurality of electrical connecting screws 241, and a conductive plate 242 is connected to the printed circuit board 24 (by riveting). Then, the electrical connecting screws 241 are secured onto the conductive plate 242, so that the electrical connecting screws 241 are electrically coupled with the switch and the dimming circuit 240 installed on the printed circuit board 24. The bottom of the printed circuit board 24 is connected to a first conductive plate 243 and a second conductive plate 244 (by riveting), and the first conductive plate 243 and the second conductive plate 244 are electrically coupled to the switch and the dimming circuit 240 installed on the printed circuit board 24. The first conductive plate 243 is bent substantially into an angle of 90 degrees, so that the bent horizontal section faces outward (as shown in FIG. 10). An engaging hole 2431 is formed at a distal end of the first conductive plate and configured to be corresponsive to one of the through installing holes 200 of the seat 20. The second conductive plate 244 is bent with an angle greater than 90 degrees and passed through the through slot 201 formed at the center of the seat 20, so that the bent oblique section obliquely faces downward. A conductive bump 2441 is formed at a position near the center of the bottom of the oblique section (as shown in FIG. 11).

In FIGS. 9 and 10, a vertical through slot 211 is formed at the center of the top of the open cylinder 21, and a through installing hole 212 is formed separately on both sides of the open cylinder 21 and configured to be corresponsive to the through installing hole 200 of the seat 2. A wall extended downwardly from the open cylinder 21 is a threaded groove wall 213.

During an assembling process, the open cylinder 21 is installed to the bottom of the seat 20, so that the bent oblique section of the second conductive plate 244 is extended from the vertical through slot 211 downwardly and obliquely to the outside (as shown in FIG. 8). The through installing holes 212 and the through installing holes 200 of the seat 20 are attached to one another, and one of the through installing holes 212 is also attached with the engaging hole 2431 of the first conductive plate 243. After one of the engaging members 245 (such as rivets) is passed through the engaging hole 2431, a through installing hole 200 and a through installing hole 212, a connection (such as riveting) is achieved, and the other engaging member 245 is passed through a through installing hole 200 and a through installing hole 212 to achieve a connection (such as riveting) until the printed circuit board 24, the knob 25, the seat 20 and the open cylinder 21 are assembled (as shown in FIG. 10).

In FIGS. 7 and 9, the cap 22 is a circular arc cap shaped object and has an outwardly protruding ring 221 disposed at the bottom of the cap 22. An outer thread 222 is formed at the bottom of the cap 22 and provided for connection. A penetrating hole 223 formed at the center of the top of the cap 22 is inwardly penetrated into an opening, and a penetrating slot 225 is formed on a circular wall (as shown in FIG. 7).

In FIG. 9, the base 23 is a longitudinal penetrating ring-shaped object with a bottom formed to be a casing 230 and a top formed to be a screwing ring 233 having an expanded external diameter. A circular stepped surface 231 is formed at a connecting position of the casing 230 and the screwing ring 233, and an inner thread 232 is formed on an inner side of the screwing ring 233 and provided for connection.

During an assembling process, the assembly comprised of the printed circuit board 24, the knob 25, the seat 20 and the open cylinder 21 is assembled, and the printed circuit board 24 is accommodated into the opening of the bottom of the cap 22 in an upward direction. In the process, the knob 25 connected to the switch and the dimming circuit 240 of the printed circuit board 24 is entered from the penetrating slot 225, and, then, a hollow of the base 23 is sheathed from bottom to top on the open cylinder 21 and the exterior of the seat 20. The inner thread 232 formed on the inner side of the screwing ring 233 is gradually engaged with the outer thread 222 formed at the bottom of the cap 22 until the outwardly protruding ring 221 of the cap 22 and the circular stepped surface 231 of the base 23 jointly clamp the seat 20, to complete the process of assembling the whole dimming lampholder 2.

Before use, a power cable (connected to the mains power) is extended into the penetrating hole 223 of the cap 22. An end of the power cable is processed to form a bare end, and the bare end of the power cable is connected with an electrical connecting screw 241 of the printed circuit board 24 to supply power to the switch and the dimming circuit 240 of the printed circuit board 24. The switch and the dimming circuit 240 may be operated to conduct the first conductive plate 243 and the second conductive plate 244. The first conductive plate 243 conduct the electrode through one of the engaging members 245 to the open cylinder 21, and the second conductive plate 244 remains in the vertical through slot 211 of the open cylinder 21. A gap is maintained between the second conductive plate 244 and the open cylinder 21, so that they are not in contact with one another.

During use, a dimmable LED bulb at the top of a screw head is inserted into the corresponsive open cylinder 21 and screwed with the threaded groove wall 213 of the open cylinder 21 to achieve the effect of contacting the screw head of the dimmable LED bulb with the conductive bump 2441 of the second conductive plate 244 securely. Now, the dimmable LED bulb, the open cylinder 21 and the conductive bump 2441 are electrically connected. In other words, the dimmable LED bulb is electrically connected to the switch and the dimming circuit 240. Therefore, the knob 25 may be turned to power on the dimmable LED bulb, and the knob 25 may be turned further to make the dimmable LED bulb brighter. The main effect resides on that the printed circuit board 24 has the dimmable switch and the dimming circuit 240 installed thereon, so that the knob 25 may be turned to adjust the brightness of dimmable LED bulb directly.

In summation, the present invention comprises the switch and the dimming circuit installed on the printed circuit board of the dimming lampholder and operated with the dimmable energy-saving fluorescent bulb and the dimmable LED bulb, so that the dimmable energy-saving fluorescent bulb and the dimmable LED bulb can be installed and used directly, to achieve the effect of dimming a lamp installed to the lampholder directly.

In summation of the description above, the present invention achieves the expected functions and objectives.

While the invention is described in some detail hereinbelow with reference to certain illustrated embodiments, it is to be understood that there is no intent to limit it to those embodiments. On the contrary, the aim is to cover all modifications, alternatives and equivalents falling within the spirit and scope of the invention as defined by the appended claims.

What is claimed is:

1. A dimming lampholder comprising a seat, a cover body, a cap, a screwing ring, a printed circuit board, a knob and a plurality of electrical connecting plates, wherein a circular stepped surface is formed at an external periphery of a top surface of the seat, wherein a positioning slot, a plurality of first engaging holes and a plurality of second engaging holes are formed on a surface enclosed by the circular stepped surface, wherein the seat is extended downwardly to form a cylindrical shape and has an opening formed at a bottom of the seat and penetrating into the seat, with a plurality of clamping slots formed on the seat;

wherein the cover body includes a plurality of engaging hole pillars protruded from a top of the cover body, with a plurality of arc chutes disposed around a periphery of the cover body and symmetrical with one another, and with an insert hole with an expanded internal diameter connected to an end of each arc chute;

wherein the cap is a circular arc cap shaped object and includes an outwardly protruding ring disposed near a bottom of the cap and having an outer thread formed at a bottom of the outwardly protruding ring and provided for connection, with a penetrating hole formed at a center of a top of the outwardly protruding ring, with the bottom of the cap being an inwardly penetrating opening, and with a penetrating slot formed on a circular wall;

wherein the screwing ring has a hollow penetrating a bottom of the screwing ring, with a circular stepped surface formed inwardly at the bottom of the screwing ring, and with an inner thread formed on an inner side of the screwing ring;

wherein the printed circuit board has a switch, a dimming circuit installed on a side of the printed circuit board, a knob coupled to the switch and the dimming circuit, and a plurality of electrical connecting screws installed at a top of the printed circuit board, with the plurality of electrical connecting screws electrically connectable to the switch and the dimming circuit, wherein a bottom of the printed circuit board has a plurality of conductive plates formed into a bent shape with a horizontal section facing outward and with a distal end having an engaging hole, and wherein the plurality of conductive plates is electrically coupled with the switch and the dimming circuit;

wherein the plurality of electrical connecting plates is formed into a bent shape with each having an engaging hole formed at a top of the electrical connecting plate and an abutting portion formed at a bottom of the electrical connecting plate;

wherein the printed circuit board is vertically erected from a bottom end from the positioning slot of the seat, wherein the engaging holes of the plurality of conductive plates of the printed circuit board are one-to-one corresponsive to the plurality of first engaging holes of the seat; wherein the plurality of electrical connecting plates is installed into the opening of the bottom of the seat in an upward direction of the engaging holes of the plurality of electrical connecting plates, wherein a middle section of the plurality of electrical connecting plates is inserted into a corresponsive clamping slot of the seat, wherein the engaging holes of the plurality of electrical connecting plates are one-to-one corresponsive to the plurality of first engaging holes of the seat, wherein the engaging holes of the plurality of conductive plates coupled to the bottom of the printed circuit board, the plurality of first engaging holes of the seat, and the engaging holes of the plurality of electrical connecting plates are connected by a plurality of engaging members respectively;

wherein the cover body is accommodated into the seat in an upward direction of the plurality of engaging hole pillars, wherein the plurality of engaging hole pillars of the cover body in the seat is one-to-one corresponsive to the plurality of second engaging holes, wherein the abutting portions of the plurality of electrical connecting plates is one-to-one correspondingly remained at the plurality of arc chutes and on a side of the insert holes of the plurality of arc chutes, and wherein the plurality of second engaging holes and the plurality of engaging hole pillars are coupled by inserting a plurality of engaging members respectively;

wherein the knob coupled to the switch and the dimming circuit of the printed circuit board enter along a penetrating slot of the knob until the circular stepped surface at the external periphery of the top surface of the seat abuts a bottom edge of the cap; and wherein the screwing ring is sheathed on the external periphery of the seat by the hollow of the screwing ring, wherein the inner thread of the screwing ring is gradually engaged with the outer thread of the cap until the circular stepped surface of the screwing ring abuts the outwardly protruding ring of the cap.

2. The dimming lampholder according to claim 1, wherein the seat has a plurality of positioning ribs disposed within a range of the circular stepped surface, wherein the cap has a plurality of positioning recesses formed at an internal periphery of the bottom of the cap, and wherein when the inner thread of the screwing ring is gradually engaged with the outer thread of the bottom of the cap, the plurality of positioning ribs formed on the circular stepped surface is one-to-one correspondingly abutted into the plurality of positioning recesses formed at the internal periphery of the bottom of the cap.

3. The dimming lampholder according to claim 1, wherein the top of the printed circuit board is connected to a conductive plate, and each electrical connecting screw is secured onto the conductive plate.

4. A dimming lampholder, comprising a seat, an open cylinder, a cap, a base, a printed circuit board and a knob bracket, wherein the seat is formed into a circular disc shape and has a plurality of through installing holes formed on both sides of the seat and a through hole formed at a middle of the seat;

wherein the open cylinder has a vertical through slot formed at a center of a top of the open cylinder, a through installing hole formed on both sides of the open cylinder separately and configured to be corresponsive to the plurality of through installing holes of the seat, and wherein a wall extended downwardly from the open cylinder is a threaded groove wall;

wherein the cap is a circular arc cap shaped object and has an outwardly protruding ring near a bottom of the cap, an outer thread formed at the bottom of the cap and provided for connection, a penetrating hole formed at a center of a top of the cap, an opening penetrated inwardly from the bottom of the cap, and a penetrating slot formed on a circular wall of the cap;

wherein the base is a longitudinally penetrating ring-shaped object with a bottom as a casing, with the top formed into a screwing ring with an expanded external diameter, and with a circular stepped surface formed at a connecting position of the casing and the screwing ring, and wherein an inner thread is formed on an inner side of the screwing ring and provided for connection;

wherein the printed circuit board has a switch, a dimming circuit installed on a side of the printed circuit board, and a knob is coupled to a side of the switch and the dimming circuit, wherein a top of the printed circuit board has a plurality of electrical connecting screws, wherein the plurality of electrical connecting screws is provided for electrically connecting the switch and the dimming circuit, wherein a bottom of the printed circuit board has a first conductive plate and a second conductive plate, wherein the first conductive plate is formed into a bent shape with a horizontal section facing outward and with an engaging hole formed at a distal end of the first conductive plate, wherein the second conductive plate is bent with an angle greater than 90 degrees with a bent oblique section downwardly oblique and with a conductive bump formed at a center of a bottom near the oblique section, and wherein the first conductive plat; the second conductive plate, the switch and the dimming circuit are electrically coupled to one another;

wherein the printed circuit board is vertically installed onto the seat, wherein the engaging hole formed on the horizontal section of the first conductive plate is configured to be corresponsive to one of the plurality of through installing holes of the seat, wherein the oblique section of the second conductive plate is passed and installed into the through hole formed at the middle of the seat, wherein the open cylinder is installed to a bottom of the seat, wherein the oblique section of the second conductive plate is extended downwardly and obliquely from the vertical through slot, wherein the through installing holes of the open cylinder are attached to the plurality of through installing holes of the seat, wherein after one of a plurality of engaging members is passed through the engaging hole of the first conductive plate, one of the plurality of through installing holes of the seat, and one of the through installing holes of the open cylinder, and after another engaging member is passed through another through installing hole of the seat and another through installing hole of the open cylinder, an assembly is accommodated into the opening formed at the bottom of the cap in an upward direction of the printed circuit board, wherein the knob disposed on the printed circuit board and coupled to the switch and the dimming circuit is entered along the penetrating slot of the cap, wherein a hollow of the base is sheathed on the open cylinder and an exterior of the seat, and wherein the inner thread of the screwing ring and the outer thread of the cap are engaged gradually until the outwardly protruding ring of the cap and the circular stepped surface of the base clamp the seat.

5. The dimming lampholder according to claim 4, wherein the top of the printed circuit board is connected to a conductive plate, and each electrical connecting screw is secured onto the conductive plate.

* * * * *